US009538546B2

(12) United States Patent
Sachs et al.

(10) Patent No.: US 9,538,546 B2
(45) Date of Patent: Jan. 3, 2017

(54) PROCESSING-TIME DEPENDENT CONTROL OF DATA BLOCK TRANSMISSION

(75) Inventors: Joachim Sachs, Sollentuna (SE); Kumar Balachandran, Pleasanton, CA (US); Konstantinos Dimou, San Francisco, CA (US); Erik Eriksson, Linköping (SE); Michael Meyer, Aachen (DE); Johan Rune, Lindingö (SE); Anders Wallén, Ystad (SE); Henning Wiemann, Aachen (DE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 14/380,089

(22) PCT Filed: Feb. 21, 2012

(86) PCT No.: PCT/EP2012/052948
§ 371 (c)(1),
(2), (4) Date: Aug. 21, 2014

(87) PCT Pub. No.: WO2013/123980
PCT Pub. Date: Aug. 29, 2013

(65) Prior Publication Data
US 2015/0043461 A1 Feb. 12, 2015

(51) Int. Cl.
*H04W 72/12* (2009.01)
*H04W 52/02* (2009.01)

(52) U.S. Cl.
CPC ..... *H04W 72/1205* (2013.01); *H04W 52/0216* (2013.01); *H04W 72/12* (2013.01)

(58) Field of Classification Search
CPC ............ H04W 72/12; H04W 52/0216; H04W 72/1205; H04N 21/234327; H04N 21/4382; H04N 1/0041; H04N 21/2662; H04N 21/2383; H04N 21/2385; H04N 21/64792; H04N 21/8456; H04N 21/4385; H04L 1/0041; H04L 1/0083; H04L 2001/0093; H04L 2001/0096
See application file for complete search history.

(56) References Cited

U.S. PATENT DOCUMENTS

2003/0007466 A1* 1/2003 Chen ................. H04W 72/1257
370/328
2003/0226089 A1* 12/2003 Rasmussen ............. H04L 1/004
714/758

(Continued)

FOREIGN PATENT DOCUMENTS

JP 2005011130 A 1/2005
JP 2011015214 A 1/2011
WO 2011011636 A2 1/2011

*Primary Examiner* — Jung-Jen Liu
(74) *Attorney, Agent, or Firm* — Coats & Bennett, P.L.L.C.

(57) ABSTRACT

A node (100; 300) of a mobile network is responsible for scheduling transmissions of data blocks between the mobile network and a terminal device (200, 200'). The node (100; 300) may for example be a base station (100) or a control node (300) of the mobile network. The node (100; 300) determines a processing time required by the terminal device (200; 200') for processing signals for transmission of one of the data blocks. The processing time is determined from a plurality of supported processing times. On the basis of the determined processing time, the node (100; 300) schedules the transmission of the data block. The terminal device (200, 200') may provide control data for determining the processing time to the node (100; 300).

26 Claims, 9 Drawing Sheets

(56) References Cited

U.S. PATENT DOCUMENTS

| | | | |
|---|---|---|---|
| 2004/0002341 A1* | 1/2004 | Chen | H04L 12/5693 455/453 |
| 2005/0208979 A1* | 9/2005 | Kim | H04N 7/152 455/566 |
| 2007/0109988 A1* | 5/2007 | Sampath | H04L 1/1854 370/321 |
| 2009/0006643 A1* | 1/2009 | Lee | H04N 21/23424 709/231 |
| 2009/0215442 A1* | 8/2009 | Lindoff | H04B 1/036 455/423 |
| 2010/0015926 A1* | 1/2010 | Luff | H04L 41/0604 455/67.13 |
| 2012/0020305 A1* | 1/2012 | Hole | H04W 72/048 370/329 |

* cited by examiner

PROCESSING-TIME DEPENDENT CONTROL OF DATA BLOCK TRANSMISSION

TECHNICAL FIELD

The present invention relates to methods for controlling transmission of data blocks and to corresponding devices.

BACKGROUND

In mobile networks, such as a 3GPP (Third Generation Partnership Project) mobile network, various types of terminal devices may be used. For example, Machine Type Communication (MTC) terminal devices, such as sensor devices, alarm devices, remote control devices, or the like may be used in addition to conventional types of terminal devices, such as mobile phones, smartphones, data modems, mobile computers, or other types of UE. MTC terminal devices are typically characterized by a modest bit rate and sparse communication. MTC terminal devices may therefore be implemented with low-performance communication capabilities.

The existence of MTC terminal devices or other devices having similar data traffic characteristics may have an impact on the mobile network, in particular if the mobile network is designed to support large bandwidths or high throughputs, as for example in a mobile network according to 3GPP LTE (Long Term Evolution).

According to the Release 8/9 versions of the LTE specifications, the supported cell bandwidth is within the range of 6 and 100 resource blocks (RBs), about 1.4 to 20 MHz, and a UE is mandated to support all specified bandwidths in order to be standard compliant. Furthermore, UEs belonging to the lowest defined release 8/9 UE category need to support bit rates of at least 10 Mbit/s in the downlink and 5 Mbit/s in the uplink, which exceeds the needs of most MTC terminal devices. The ability to support high bandwidth, in particular bandwidth flexibility, and high throughput drives both cost and power consumption in the MTC terminal device. Accordingly, it is desirable to define low-performance UE categories in order to meet the characteristics of MTC terminals devices.

With the introduction of low-performance UE categories, it is possible to manufacture terminal devices with considerably less complexity and/or power consumption. In particular, the cost of each device is to a large extent driven by the silicon area. With significantly reduced throughput requirements, it is possible to reduce the size of hardware accelerators that are used to perform the most computationally complex operations, or even to replace them altogether with software implementations. Similarly, in a software-based implementation it is possible to replace large, possibly multiple, processors with smaller and/or fewer ones.

The potential to reduce the power consumption in a terminal device also strongly depends on the supported bitrates. Given a specific UE implementation, operation at the maximum supported bitrate requires a certain number of baseband processing operations, corresponding to a certain power consumption. Lower bitrates than the maximum one require fewer baseband processing operations, whether implemented in hardware or software. Consequently, support of lower bitrates may also be used for enabling reduction of energy consumption by the terminal device.

Even though it is possible to lower device complexity and/or power consumption when the throughput requirements are lower, there are typically still some timing constraints that need to be fulfilled in order to comply with a particular mobile network standard. For example, in 3GPP LTE one such timing constraint is associated with feedback messages of a retransmission protocol on the physical layer, which is used for reporting whether a data transmission has been successfully decoded by the UE or not. This timing constraint may actually limit how much simplified a particular implementation can be made, and/or how much the power consumption can be reduced. For example, a slower receiver processing at the terminal device may result in that the processing of a received data block has not yet terminated by the time that the next data block is being transmitted by the mobile network to the terminal device. In this case, terminal device may need to discard the transmitted data block, which reduces the efficiency of data transmission.

Accordingly, there is a need for techniques which allow for efficiently controlling transmission of data blocks between a mobile network and a terminal device.

SUMMARY

According to an embodiment of the invention, a method of controlling transmission of data blocks between a mobile network and at least one terminal device is provided. According to the method a node of the mobile network, e.g., a base station or a control node, determines a processing time required by the terminal device for processing signals for transmission of one of the data blocks. The processing time is determined from a plurality of supported processing times. On the basis of the determined processing time, the node schedules the transmission of the data block.

According to a further embodiment of the invention, a method of controlling transmission of data blocks between a mobile network and a terminal device is provided. According to the method, the terminal device determines, from a plurality of supported processing times, a processing time required by the terminal device for processing signals for transmission of one of the data blocks. On the basis of the determined processing time, the terminal device controls the transmission of the data blocks.

According to a further embodiment of the invention, a node for controlling transmission of data blocks between a mobile network and at least one terminal device is provided. The node may for example be a base station or a control node. The node comprises a processor. The processor is configured to determine, from a plurality of supported processing times, a processing time required by the terminal device for processing signals for transmission of one of the data blocks. Further, the processor is configured to schedule transmission of the data block, the scheduling being performed on the basis on the basis of the determined processing time.

According to a further embodiment of the invention, a terminal device for use in a mobile network is provided. The terminal device comprises a radio interface for transmission of data blocks between the terminal device and the mobile network. Further, the terminal device comprises a processor. The processor is configured to determine, from a plurality of supported processing times, a processing time required by the terminal device for processing signals for transmission of one of the data blocks. Further, the processor is configured to control the transmission of the data blocks on the basis of the determined processing time.

According to a further embodiment of the invention, a computer program product is provided, e.g., in the form of a physical storage medium. The computer program product comprises program code to be executed by a processor of a node of a mobile network for controlling transmission of data blocks between the mobile network and at least one terminal device. By executing the program code, the node is configured to determine, from a plurality of supported processing times, a processing time required by the terminal device for processing signals for transmission of one of the data blocks, and to schedule the transmission of the data block on the basis of the determined processing time.

According to a further embodiment of the invention, a computer program product is provided, e.g., in the form of a physical storage medium. The computer program product comprises program code to be executed by a processor of a terminal device configured for transmission of data blocks between a mobile network and at least one terminal device. By executing the program code, the terminal device is configured to determine, from a plurality of supported processing times, a processing time required by the terminal device for processing signals for transmission of one of the data blocks, and to control the transmission of the data blocks on the basis of the determined processing time.

DETAILED DESCRIPTION OF EMBODIMENTS

In the following, the invention will be explained in more detail by referring to exemplary embodiments and to the accompanying drawings. The illustrated embodiments relate to concepts involving transmission data blocks between a base station of a mobile network and a terminal device.

Figure 1:
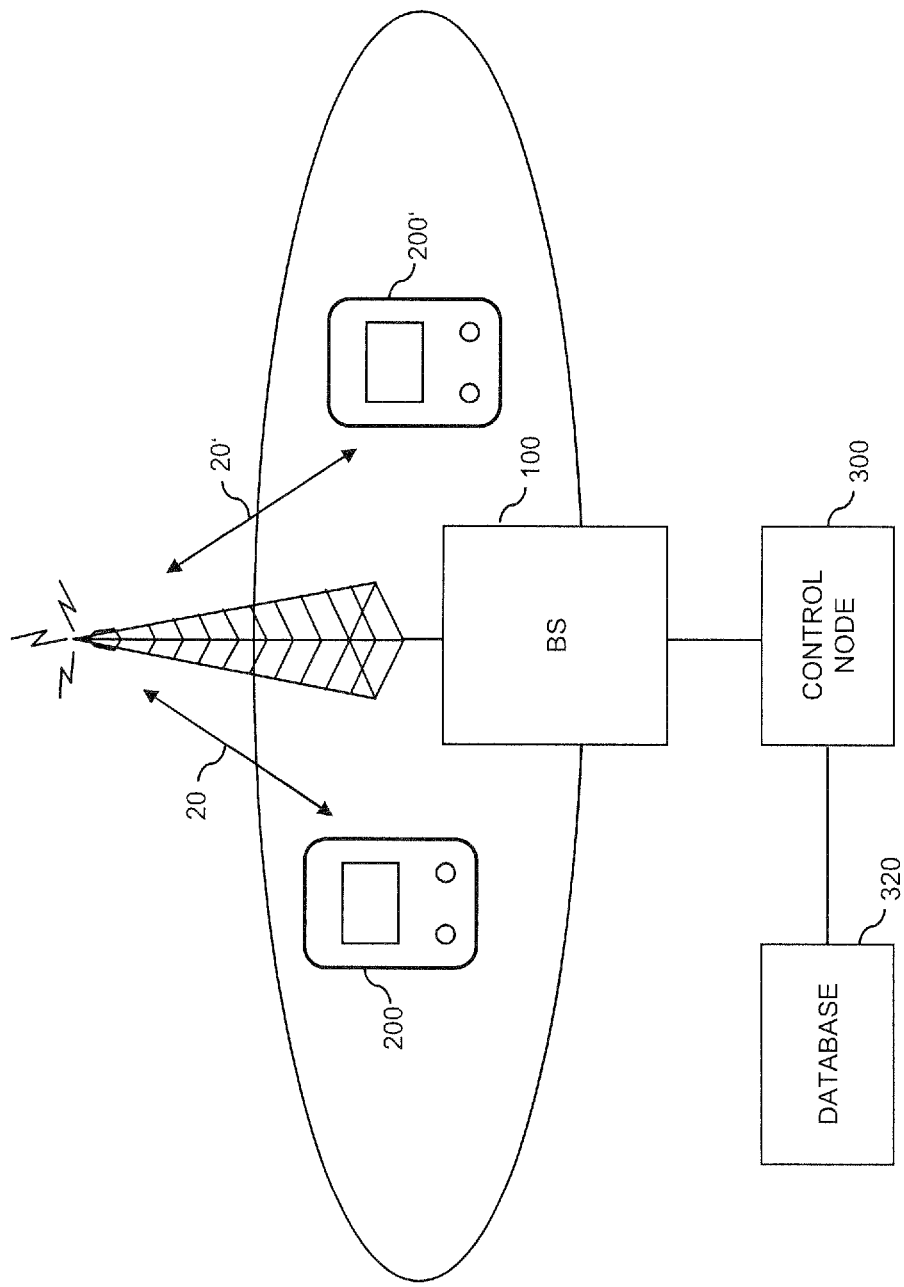
FIG. 1 schematically illustrates a mobile network environment in which concepts according to an embodiment of the invention can be applied.

FIG. 1 schematically illustrates a mobile network environment, i.e., infrastructure of a mobile network, represented by a base station (BS) 100, a control node 300 and a database 320, as well as a first terminal device 200 and a second terminal device 200' which may connect to the mobile network for transmission of data, e.g., for reception of data from the BS 100 and/or for sending of data to the BS 100, as illustrated by arrows 20, 20'. The transmission of data is assumed to occur in the form of data blocks, in the following also referred to as transport blocks, having a certain size. In some scenarios, different sizes of data blocks can be supported by the mobile network, which means that the data block size can vary from one data block to the other.

If the mobile network is implemented according to 3GPP LTE, the BS 100 may be an evolved Node B (eNB), and the control node 300 may be a Mobility Management Entity (MME). The database 320 may for example be implemented by a Home Subscriber Server (HSS). If the mobile network is implemented as a Universal Mobile Telecommunications System (UMTS) network, the BS 100 may be a Node B (NB), and the control node 300 may be a Radio Network Controller (RNC).

In the illustrated example, it is assumed that the second terminal device 200' has lower processing capabilities than the first terminal device 200. For example, the first terminal device 200 may be a mobile phone, portable computer, or other type of user equipment (UE), whereas the second terminal device 200' is a MTC terminal device, a low-cost UE, or a UE operated in a low-power mode. For example, the second terminal device 200' may have a lower amount of buffer for soft decoding or a lower processing performance than the first terminal device 200. Also the second terminal device 200' may have other retransmission protocol capabilities than the first terminal device 200. For example, the first terminal device 200 and the second terminal device may use a Hybrid Automatic Repeat Request (HARQ) protocol for transmission of the data blocks to or from the base station, and the number of retransmissions allowed for the second terminal device 200' may be lower than for the first terminal device 200. In some scenarios, no retransmissions may be allowed for the second terminal device 200', i.e., the number of allowed retransmissions may be zero. Further, the number of HARQ processes which are allowed in parallel could be lower for the second terminal device 200' than for the first terminal device 200. For example, the second terminal device could allow only one HARQ process in parallel.

The different processing capabilities may in particular result in different processing times required by the terminal devices 200, 200' for processing signals for transmission of one of the data blocks, e.g., for decoding signals for transmission of a data block from the mobile network to the terminal device 200, 200' or for encoding signals for transmission of a data block from the terminal device 200, 200' to the mobile network. For example, such a processing time may be defined in terms of a HARQ feedback time, i.e., the time interval between receiving a data block and sending an acknowledgement (ACK) or a negative acknowledgement (NACK) for this data block to indicate whether the data block was successfully received or not. The processing time may also defined in terms of a receiver decoding time D required by the terminal device to perform decoding of received signals for transmission of a data block of a given size.

The concepts as described herein may be used for efficiently dealing with different processing capabilities of terminal devices as for example the first and second terminal devices 200, 200'. For this purpose, the mobile network supports different processing times of terminal devices, e.g., different HARQ feedback times. Accordingly, terminal devices having different processing times may connect to the mobile network, and the mobile network takes into account these different processing times when transmitting data blocks to or from these terminal devices. Also, variations of the processing time of the same terminal device may be taken into account, e.g., variations due to switching of the terminal device into a low-power mode. According to the concepts described herein, a node of the mobile network which is responsible for scheduling the transmissions of data blocks between the mobile network and the terminal device 200, 200' determines the processing time of the terminal device 200, 200'. For example in the above-mentioned LTE scenario, this node may be the BS 100. Alternatively, e.g., in the above-mentioned UMTS scenario, this node may be the control node 300. The node then performs the scheduling performed on the basis of the determined processing time. In particular, a time interval between sending the signals for transmission of two consecutive data blocks may be controlled to be larger than the determined processing time. In this way, it can be ensured that the terminal device has finished processing the signals of one data block before the transmission of the next data block.

Various procedures can be used by the node of the mobile network for determining the processing time. For example, the node may obtain the processing time from another node or from the terminal device itself. In the mobile network environment of FIG. 1, the BS 100 could obtain the processing time of the first terminal device 200 and/or of the second terminal device 200' from the control node 300. In the above-mentioned LTE scenario, this would mean that the eNB obtains the processing time from the MME. The node could also obtain the processing time from a database, e.g., the database 320. Moreover, the node could obtain the processing time from a node of a core network of the mobile network, e.g., when the terminal device 200, 200' attaches to the mobile network. For obtaining the processing time, the node may receive control data from the other node of the mobile network or from the terminal device 200, 200' itself. The control data may explicitly indicate the processing time or may include data which allow for determining the processing time. The node may also determine the processing time from data indicating a device category of the terminal device 200, 200', e.g., as a value assigned to the device category. The device category could for example indicate that the second terminal device is a low-performance UE. The data indicating the device category may in turn be received from another node of the mobile network or from the terminal device 200, 200' itself. Also, the node could determine the processing time from other data available at the node, e.g., from UE capability information signaled to the node. The node could also receive data related to the terminal device 200, 200' from the database 320 and determine the processing time from this data. The node may also initiate a measurement of the processing time, e.g., by evaluating the terminal device's 200, 200' response to a received data block. Moreover, the node could set the processing time and send control data indicating the set processing time to the terminal device 200, 200'. Such control data may in turn cause the terminal device to adjust its operation to match the indicated processing time, e.g., by entering a low-power mode if available. If the mobile network supports variable sizes of the data blocks, the processing time may also be determined on the basis of the sizes of the data blocks. Scheduling of the data transmissions may then be accomplished depending on the different individual data block sizes used in the data transmissions.

In some scenarios, the processing time may also be taken into account by the terminal device itself, e.g., by controlling the transmission of data blocks accordingly.

Figure 2:
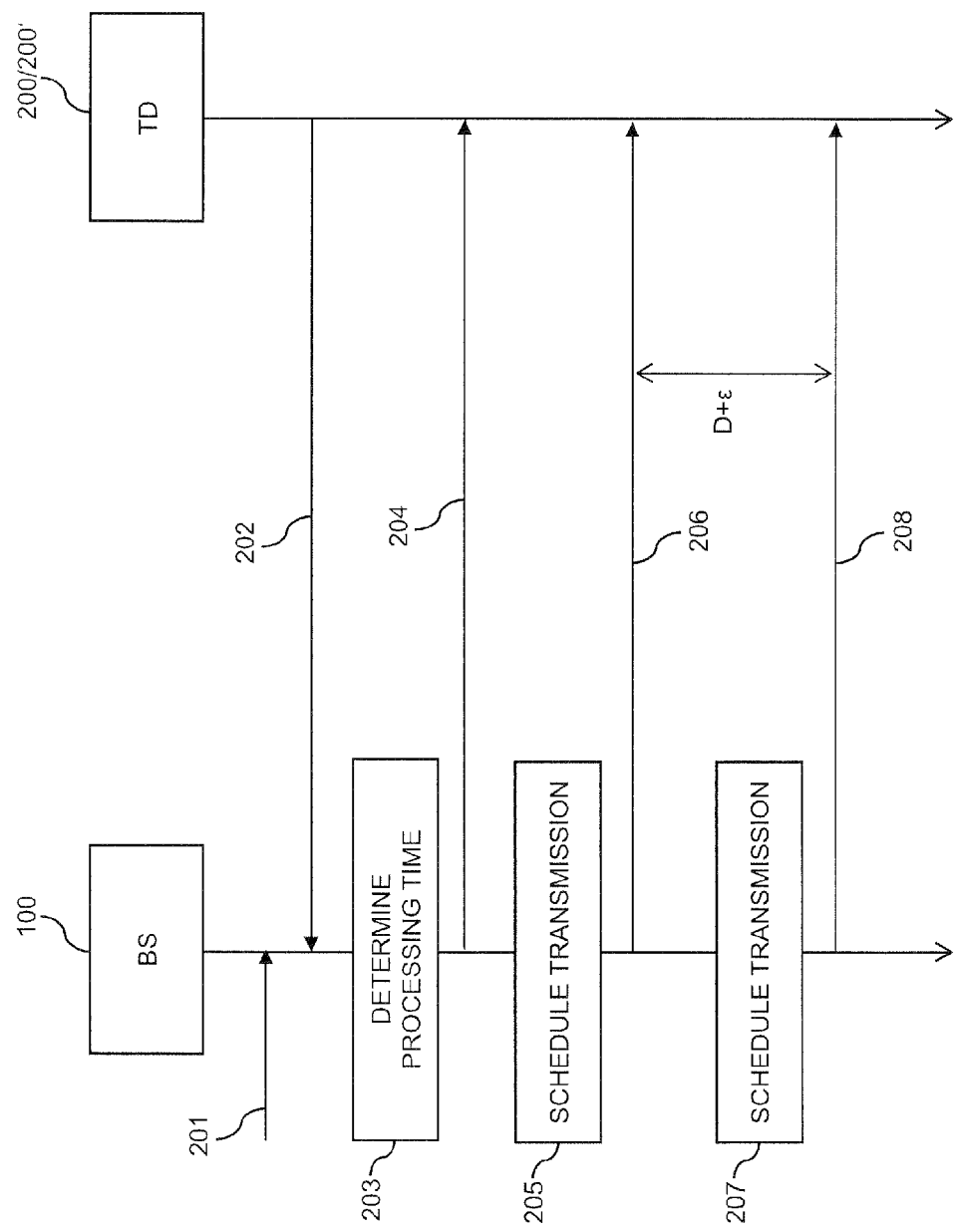
FIG. 2 shows a signaling diagram for schematically illustrating exemplary procedures according to an embodiment of the invention.

In the following, the concepts will be explained in more detail by referring to an exemplary implementation for downlink transmissions, i.e., from the mobile network to the terminal device 200 or 200', when assuming the above-mentioned LTE scenario. In this case, the processing time can be defined as a time D required by the terminal device 200, 200' for decoding signals for transmission of a transport block of a given size. FIG. 2 shows a signaling diagram for illustrating exemplary procedures of such implementation.

The procedures of FIG. 2 involve the BS 100 and the terminal device (TD) 200 or 200'. The BS 100 is responsible for scheduling transmissions of transport blocks to the terminal device 200/200'.

Initially, the BS 100 may receive control data, e.g., by message 201 from a further node of the mobile network and/or by message 202 from the terminal device 200/200'. The further node of the mobile network may be the database 320, e.g., a subscription database or a device database implemented by the HSS. The database may for example associate data provided by a Subscriber Identity Module (SIM) of the terminal device 200/200', e.g., an International Mobile Subscription Identity (IMSI), to a device identifier, e.g., an International Mobile Equipment Identifier (IMEI), or to a device type or category. In some scenarios, the message 201 may also be received from a control node, e.g., the MME. The further node may for example be a node of the core network which is capable of providing device-specific information, e.g., on the basis of the IMEI.

At step 203, the BS 100 determines the processing time D. This may be accomplished on the basis of the control data received in message 201 and/or in message 202. For example, the BS 100 may set the processing time D to a known value, e.g., on the basis of data configured in the BS 100. Further, the processing time D may be a parameter associated with the subscriber of the terminal device 200/200', e.g., as identified by a SIM, or the terminal device 200/200' itself, e.g., as identified by the IMEI or other device identifier, and be stored in a subscription database or device database, e.g., in the HSS. The processing time D may then be provided to the core network and/or RAN during attachment of the terminal device 200, 200' to the mobile network.

Further, the BS 100 may determine the processing time D in relation to another parameter: Examples of such other parameters are protocol timers, such as a Radio Link Control (RLC) protocol timer.

The processing time D may also be a value assigned to a device category of the terminal device 200/200'. The device category may in turn be signalled to the BS 100 using message 201, i.e., from the further node of the mobile network, e.g., from the core network, or using message 202, i.e., from the terminal device 200/200'.

The message 201 and/or the message 202 may explicitly indicate the processing time D. For example, the message 202 may be a Radio Resource Control (RRC) protocol message. In this case, the processing time D may be explicitly indicated as UE capability information, using the "UECapabilityInformation" RRC message. Alternatively, the message 202 could be a control element of a Medium Access Control (MAC) protocol used between the terminal device 200/200' and the BS 100, also referred to as MAC Control Element.

In some scenarios, the terminal device 200/200' may determine the processing time D to be indicated to the BS 100 using message 202. For example, the terminal device 200/200' may learn the processing time D using a suitable procedure, e.g., by measuring the time needed to decode signals for transmission of a transport block. Such procedures can be initiated by the terminal device 200/200' or by the BS 100.

In some scenarios, the BS 100 may learn the processing time D, e.g., by evaluating responses to transmissions of transport blocks received from the terminal device 200/200'. Examples of such responses are HARQ feedback messages or feedback messages of the RLC protocol. For example, the BS 100 may measure the time interval between sending a transport block to the terminal device 200/200' and receiving the corresponding response from the terminal device 200/200'.

In some scenarios, a default value of the processing time D may be included in subscription data or device data and be provided to the BS 100 using message 201, and it may be possible to override this default value by a new value provided by the terminal device 200/200' using message 202.

In some scenarios, the processing time D as provided from the terminal device 200/200' to the BS 100 may be adapted to changing conditions, e.g., a battery status of the terminal device 200/200'. For example, if the battery level decreases below a certain threshold, the terminal device 200/200' could indicate a larger value of the processing time D to the BS 100. In some scenarios, e.g., if the terminal device 200/200' uses energy harvesting methods, such as solar power or piezo-electric energy harvesting, the processing time D indicated by the terminal device 200/200' to the BS 100 may depend on an estimated amount of energy this energy harvesting can provide in a given period of time. For example, a solar powered terminal device 200/200' would be able to store energy at a lower rate when the sky is overcast, and a piezo-electric energy harvester embedded in a roadbed would accumulate more energy during rush hour when the traffic is heavy. Thus, during times of high productivity of energy harvesting, the terminal device 200/200' may indicate a smaller processing time D, e.g., corresponding to operation in a normal mode, whereas the terminal device 200/200' could indicate a larger processing time D, e.g., corresponding to operation in a low power mode, when energy harvesting is less productive.

The determination of the processing time D at step 203 may involve a selection between multiple predefined values of the processing time D, e.g., 8 ms and multiples thereof. In this case, the selected value may correspond to an allowed maximum value of the processing time D, i.e., the terminal device 200/200' may actually be faster than the selected value, but not slower.

By message 204, the BS 100 may send control data indicating the processing time determined at step 203 to the terminal device 200/200'. In some cases, this may confirm a value of the processing time D which was provided by the terminal device 200/200' in message 202. In other cases, this may cause the terminal device to adjust its operation accordingly, e.g., by entering or leaving a low-power mode. The message 204 may for example be a message of the RRC protocol or a MAC Control Element.

At step 205, the BS 100 schedules a transmission 206 of a transport block to the terminal device 200, 200'. The scheduling at step 205 involves determining scheduling information, in particular time resources and frequency resources for transmission of the transport block. In accordance with this scheduling information, the BS 100 performs the transmission 206 of the transport block to the terminal device 200/200'.

At step 207, the BS 100 schedules the next transmission 208 of a further transport block to the terminal device 200/200'. If the terminal device 200/200' allows multiple HARQ processes in parallel, the transmission 208 is the next transmission of the same transmission/reception process. The scheduling at step 207 is accomplished taking into account the processing time D as determined at step 203. In particular, the BS 100 may schedule the two consecutive transmissions 206, 208 in such a way that the time interval between sending the transmissions 206, 208 to the terminal device 200/200' is larger than the determined processing time D. In this way, it can be ensured that the terminal device 200/200' can finish decoding the first transmission 206 before receiving the second transmission 208.

The scheduling at step 206 may thus involve determining a suitable time resources for the transmission 208. This may for example be accomplished by determining the time of the second transmission depending on the time of the first transmission and the decoding time D determined at step 203. This may for example be implemented by the BS 100 determining the time of the second transmission according to:

$$T2 = T1 + D + \epsilon,$$

wherein T1 is the time of the first transmission, T1 is the time of the second transmission, and $\epsilon$ is an optional safety margin. For taking into account the time T1 of the first transmission 206 when scheduling the second transmission 208, the BS 100 may store times of sending earlier transmissions so that they can be taken into account when scheduling later transmissions.

In accordance with the scheduling information determined at step 207, the BS 100 performs the transmission 208 of the transport block to the terminal device 200/200'.

The scheduling of the transmissions 206, 208 at steps 205 and 207 may also involve sending scheduling information to the terminal device 200/200'. In particular, the scheduling information provided to the terminal device 200/200' may indicate which time resources and frequency resources are to be monitored by the terminal device 200/200'. The scheduling information may be transmitted on a control channel, e.g., the Physical Downlink Control Channel (PDCCH).

In some scenarios, the processing time D determined at step 203 may depend on the size of the transport block to be transmitted. This dependency can be defined at the BS 100 by using an algebraic expression and/or a lookup table. In this case, the scheduling of the transport block may be accomplished on the basis of the processing time D as determined for the size of this particular transport block. For this purpose, the processing time D may be determined each time when a transmission of a transport block is scheduled.

Figure 3:
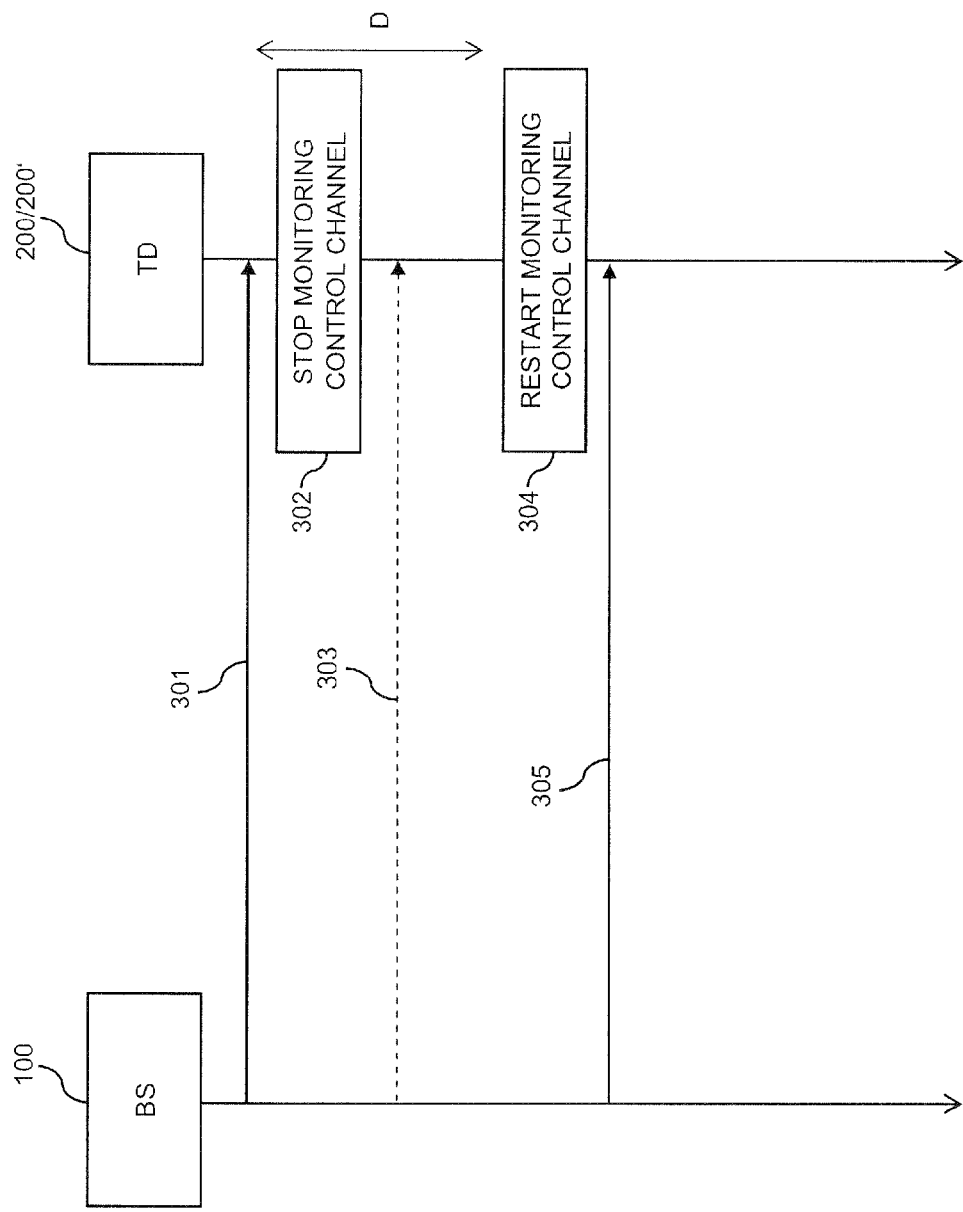
FIG. 3 shows a signaling diagram for schematically illustrating further exemplary procedures according to an embodiment of the invention.

FIG. 3 shows a signaling diagram for illustrating further exemplary procedures which may be performed at the terminal device 200/200'. These procedures are performed in addition to the processing-time dependent scheduling as described in connection with FIG. 2. The procedures of FIG. 3 involve the BS 100 and the terminal device (TD) 200 or 200'. The BS 100 is responsible for scheduling transmissions of transport blocks to the terminal device 200/200'.

In the procedures of FIG. 3, the BS 100 sends scheduling information 301 for a transmission of a transport block to the terminal device 200/200'. As mentioned above, this is accomplished on a control channel, e.g., the PDCCH. The terminal device 200/200' receives the scheduling information 301. Considering the processing time-dependent scheduling at the BS 100, the terminal device 200/200' may temporarily stop monitoring the control channel in response to receiving the scheduling information 301, as indicated by step 302. This is possible because the processing-time dependent scheduling performed by the BS 100 typically ensures that no further transmission to the terminal device 200/200' is scheduled for a time interval corresponding to at least the processing time D. Any scheduling information 303 which is then sent by the BS 100, e.g., scheduling information pertaining to another terminal device served by the BS 100, will not be received by the terminal device 200/200'.

At step 304, after expiry of the time interval corresponding to the processing time D, the terminal device 200/200' restarts monitoring the control channel and can again receive scheduling information 305 sent by the BS 100, e.g., scheduling information pertaining to the transmission of a further transport block from the BS 100 to the terminal device 200/200'. This temporary stopping the monitoring of the control channel depending on the processing time D may in particular be used for power saving at the terminal device 200/200'.

Figure 4:
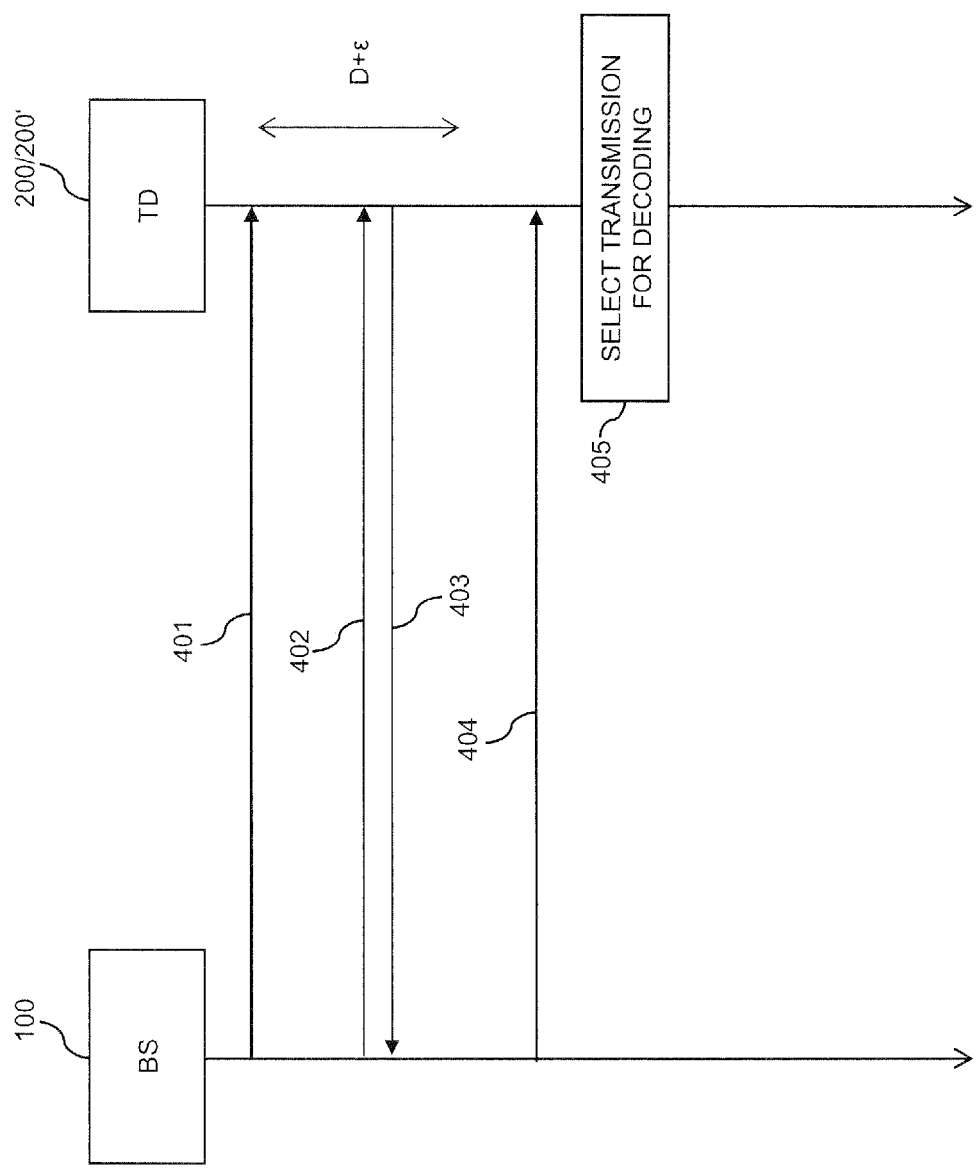
FIG. 4 shows a signaling diagram for schematically illustrating further exemplary procedures according to an embodiment of the invention.

FIG. 4 shows a signaling diagram for illustrating further exemplary procedures which may be performed at the terminal device 200/200'. These procedures may be performed in addition to the processing-time dependent scheduling as described in connection with FIG. 2. The procedures of FIG. 4 may also be combined with the procedures of FIG. 3. The procedures of FIG. 4 involve the BS 100 and the terminal device (TD) 200 or 200'. The BS 100 is responsible for scheduling transmissions of transport blocks to the terminal device 200/200'.

In the procedures of FIG. 4, the BS 100 performs a transmission 401 of a transport block to the terminal device 200/200'. Further, the BS 100 performs a next transmission 402 of a further transport block. Here, it is assumed that the next transmission is performed within a time interval corresponding to the processing time D and starting after receiving the transmission 401. For example, the BS 100 may have performed scheduling of the transmission 402 without properly taking into account the processing time D, e.g., due to a change of the processing time D when switching the terminal device 200/200' into a low-power mode.

In response to receiving the transmission 402, the terminal device 200/200' sends a HARQ NACK 403 to the BS 100. This is accomplished before attempting to decode the received transmission 402. In this way, the terminal device 200/200' can avoid processing of the transmission 402 while processing of the transmission 401 is not yet finished.

The BS 100 may then perform a retransmission 404 of the further transport block. In the scenario of FIG. 4, it is assumed that this retransmission occurs after expiry of the time interval corresponding to the processing time D and starting after receiving the transmission 401. Accordingly, processing of the received retransmission 404 at the terminal device 200/200' is now possible. Earlier retransmissions of the further transport block may be handled in a similar manner as the transmission 402.

In some scenarios, as indicated by step 405, the terminal device 200/200' may select which one of the transmission 402 and the retransmission 404 to decode. This selection may be based on a probability of successfully decoding the transmission 402 or the retransmission 404, e.g., as estimated from a Signal/Interference-to-Noise-Ratio (SINR) of the received signals of the transmission 402 and the retransmission 404. In some cases, the terminal device 200/200' may also combine the received transmission and the received retransmission 404 to increase the probability of successful decoding.

The procedures of FIGS. 2 to 4 may be implemented by signaling the processing time D, or information allowing for determining the processing time D, from the terminal device 200/200' to the BS 100 or vice versa. As indicated in connection with the message 202 of FIG. 2, this may be accomplished by using existing protocols, such as the RRC protocol, the RLC protocol, or the MAC protocol. For this purpose, new information elements in messages of these protocols may be defined or existing information elements be modified. In implementations in which no HARQ retransmissions are used, a modified PDCCH format may be used, e.g., a PDCCH format which does not contain a HARQ process identifier and/or avoids using the Physical HARQ Indicator Channel (PHICH).

Figure 5:
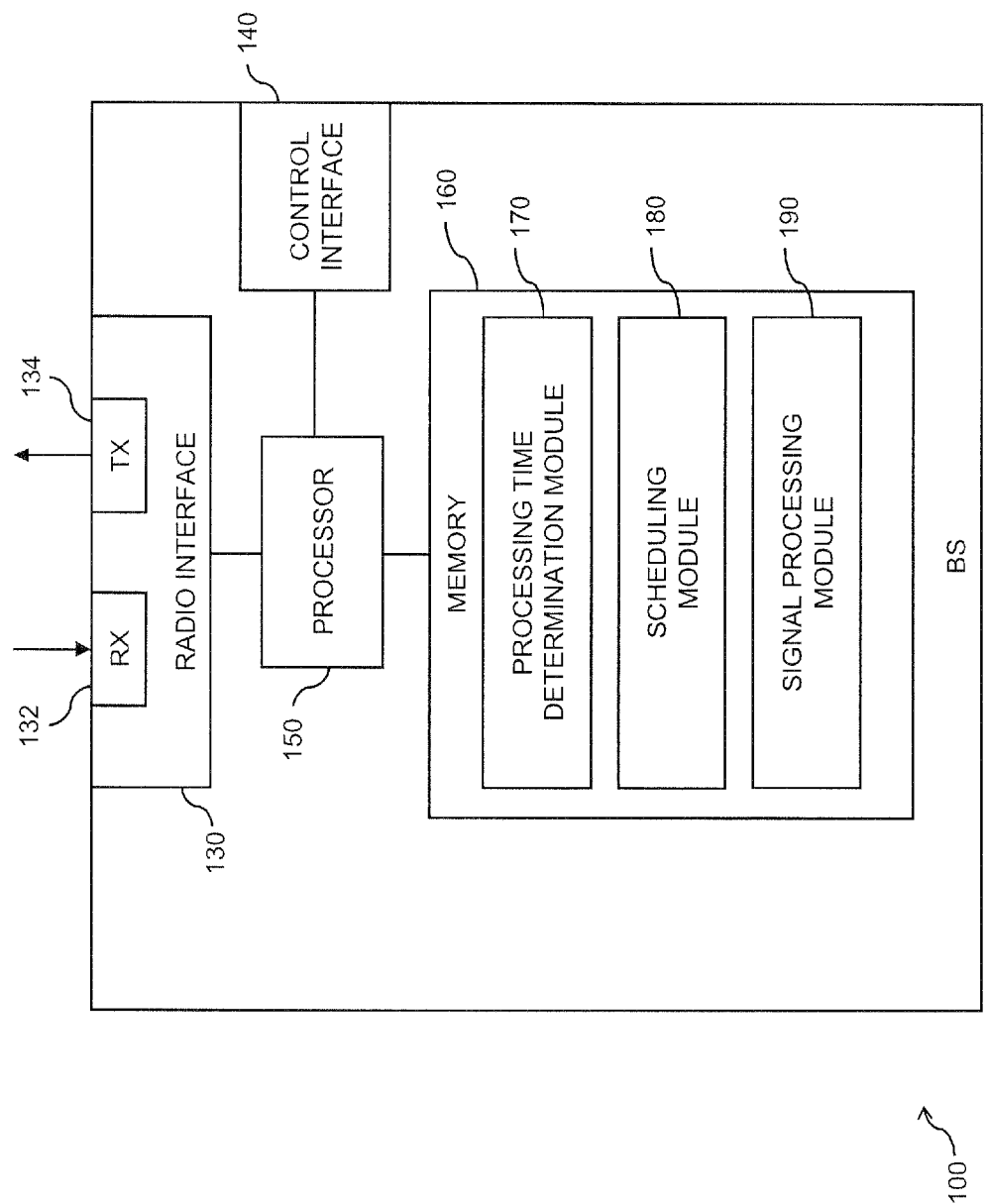
FIG. 5 schematically illustrates a base station according to an embodiment of the invention.

FIG. 5 schematically illustrates exemplary structures for implementing the above-described concepts in the BS 100, assuming that the BS 100 is responsible for the scheduling of transmissions of data blocks.

In the illustrated structure, the BS 100 includes a radio interface 130 for transmitting transmissions to one or more terminal devices, e.g., the terminal devices 200, 200', and/or for receiving transmissions from these terminal devices. It is to be understood that for implementing transmitter (TX) functionalities the radio interface 130 will include one or more transmitters 134, and that for implementing receiver (RX) functionalities the radio interface 130 will include one or more receivers 132. In the above-mentioned LTE scenario, the radio interface 130 may correspond to the Uu interface. Further, the BS 100 may include a control interface 140 for communicating with other nodes of the mobile network, e.g., the control node 300 of FIG. 1.

Further, the BS 100 includes a processor 150 coupled to the interfaces 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include a processing time determination module 170 for accomplishing the above-described determination of the processing time required by a terminal device for processing signals for transmission of a data block. Further, the memory 160 may include a scheduling module 180 for performing the scheduling of transmissions of data blocks to or from a terminal device. As mentioned above, this scheduling may be accomplished taking into account the individual processing times of the terminal device. Further, the memory 160 may also include a signal processing module 190, e.g., for performing decoding of incoming transmissions or encoding of outgoing transmissions. However, it is to be understood that signal processing may at least in part also be accomplished by dedicated hardware, e.g., in the form of one or more signal processors.

It is to be understood that the structure as illustrated in FIG. 5 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS. According to some embodiments, also a computer program product may be provided for implementing concepts according to embodiments of the invention, e.g., a computer-readable medium storing the program code and/or other data to be stored in the memory 160.

Figure 6:
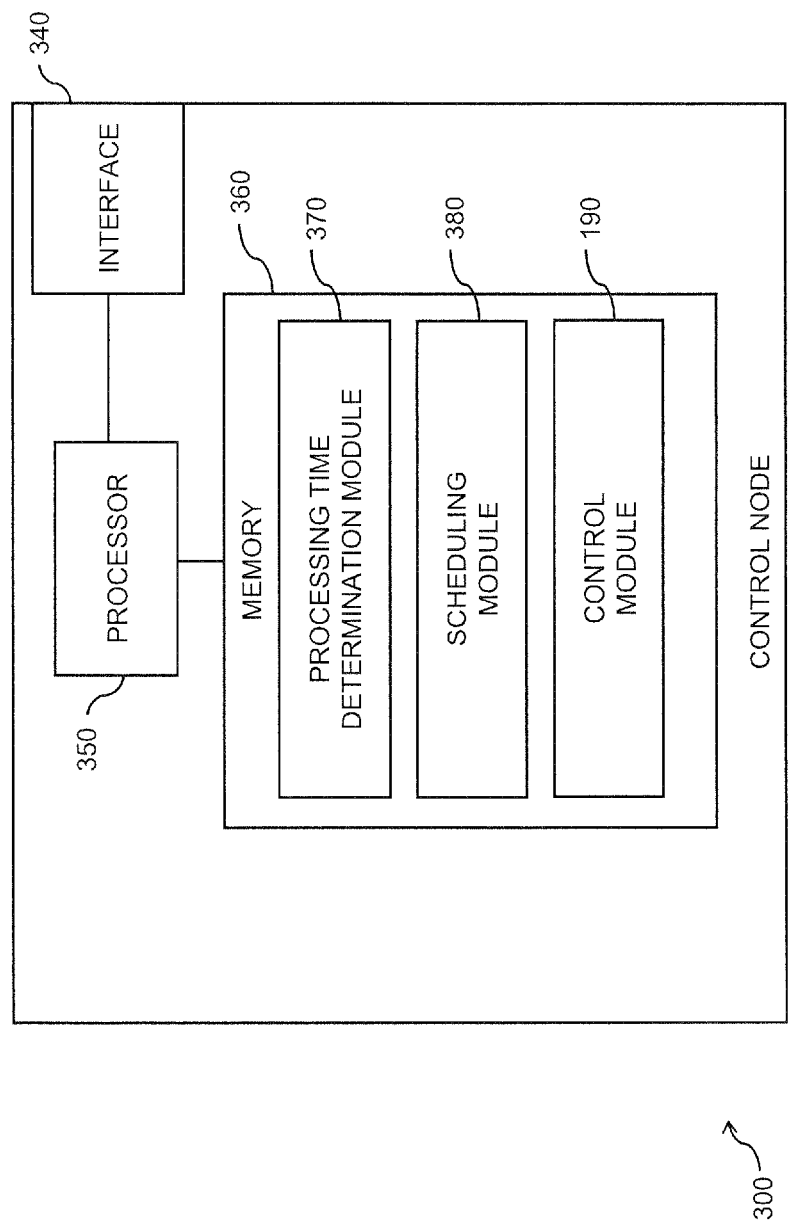
FIG. 6 schematically illustrates a control node according to an embodiment of the invention.

FIG. 6 schematically illustrates exemplary structures for implementing the above-described concepts in the control node 300, assuming that the control node 300 is responsible for the scheduling of transmissions of data blocks.

In the illustrated structure, the control node 300 includes an interface 340 for communicating with a BS of the mobile network, e.g., the BS 100 of FIG. 1. In the above-mentioned UMTS scenario, the interface 340 may be implemented by the Iub interface.

Further, the control node 300 includes a processor 350 coupled to the interface 340 and a memory 360 coupled to the processor 350. The memory 360 may include a ROM, e.g., a flash ROM, a RAM, e.g., a DRAM or SRAM, a mass storage, e.g., a hard disk or solid state disk, or the like. The memory 360 includes suitably configured program code to be executed by the processor 350 so as to implement the above-described functionalities of the control node 300. More specifically, the memory 360 may include a processing time determination module 370 for accomplishing the above-described determination of the processing time required by a terminal device for processing signals for transmission of a data block. Further, the memory 360 may include a scheduling module 380 for performing the scheduling of transmissions of data blocks to or from a terminal device. As mentioned above, this scheduling may be accomplished taking into account the individual processing time of the terminal device. Further, the memory 360 may also include a protocol processing module 390, e.g., for performing protocol handling functionalities, e.g., generating messages or evaluating messages.

It is to be understood that the structure as illustrated in FIG. 6 is merely schematic and that the control node 300 may actually include further components which, for the sake of clarity, have not been illustrated, e.g., further interfaces or additional processors. Also, it is to be understood that the memory 360 may include further types of program code modules, which have not been illustrated. For example, the memory 360 may include program code modules for implementing typical functionalities of a control node, e.g., of an RNC in a UMTS mobile network. According to some embodiments, also a computer program product may be provided for implementing concepts according to embodiments of the invention, e.g., a computer-readable medium storing the program code and/or other data to be stored in the memory 360.

Figure 7:
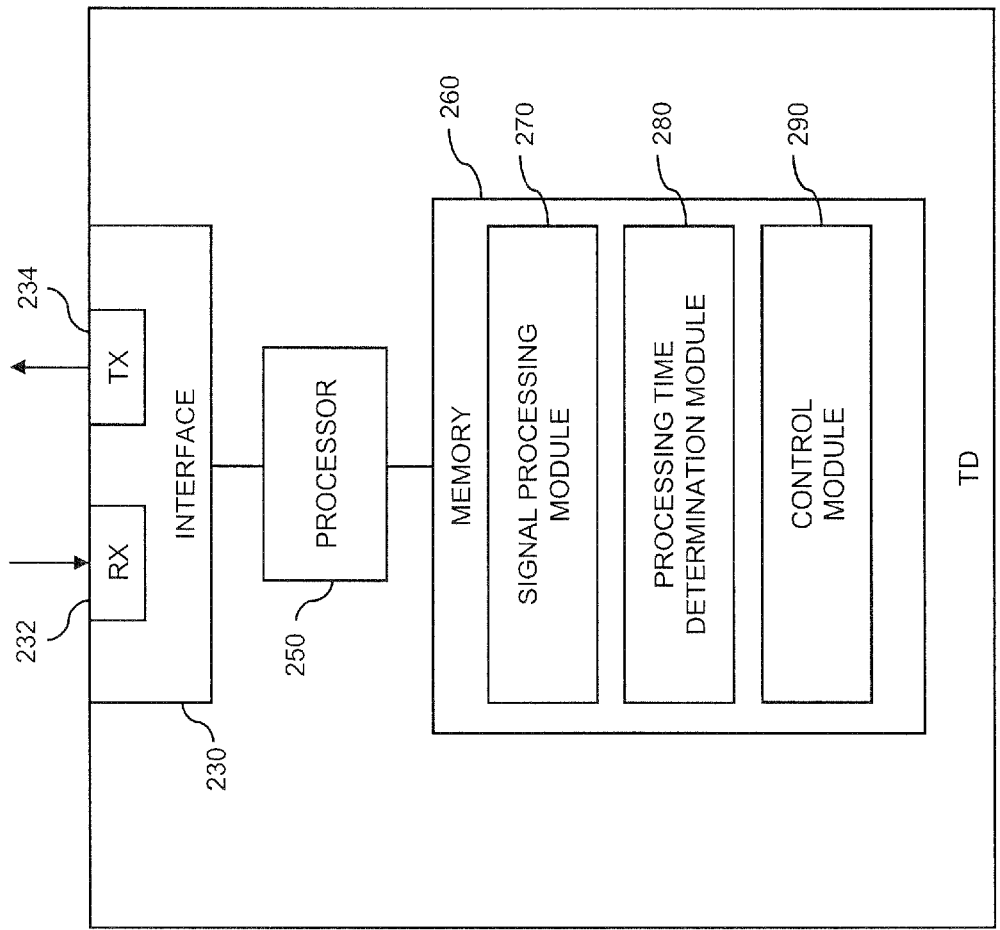
FIG. 7 schematically illustrates a terminal device according to an embodiment of the invention.

FIG. 7 schematically illustrates exemplary structures for implementing the above-described concepts in the terminal device 200/200'.

In the illustrated structure, the terminal device 200/200' includes a radio interface 230 for performing transmissions to or from a BS of a mobile network, e.g., the BS 100. It is to be understood that for implementing transmitter (TX) functionalities the radio interface 230 will include one or more transmitters 234, and that for implementing receiver (RX) functionalities the radio interface 230 will include one or more receivers 232. In the above-mentioned LTE scenario, the radio interface 230 may correspond to the Uu interface.

Further, the terminal device 200/200' includes a processor 250 coupled to the radio interface 230 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities of the terminal device 200/200'. More specifically, the memory 260 may also include a signal processing module 270, e.g., for performing decoding of incoming transmissions or encoding of outgoing transmissions. However, it is to be understood that signal processing may at least in part also be accomplished by dedicated hardware, e.g., in the form of one or more signal processor. Further, the memory 260 may include a processing time determination module 280 for accomplishing the above-described determination of the processing time required by the terminal device 200/200' for processing signals for transmission of a data block. Further, the memory 260 may include an operation control module 290 for controlling transmission of data blocks in accordance with the determined processing time, e.g., by temporarily stopping monitoring of a control channel as described in connection with FIG. 3 or by refraining from processing of received transmissions as described in connection with FIG. 4.

It is to be understood that the structure as illustrated in FIG. 7 is merely schematic and that the terminal device 200/200' may actually include further components which, for the sake of clarity, have not been illustrated, e.g., further interfaces or additional processors. Also, it is to be understood that the memory 260 may include further types of program code modules, which have not been illustrated. For example, the memory 260 may include program code modules for implementing typical functionalities of a terminal device. According to some embodiments, also a computer program product may be provided for implementing concepts according to embodiments of the invention, e.g., a computer-readable medium storing the program code and/or other data to be stored in the memory 260.

Figure 8:
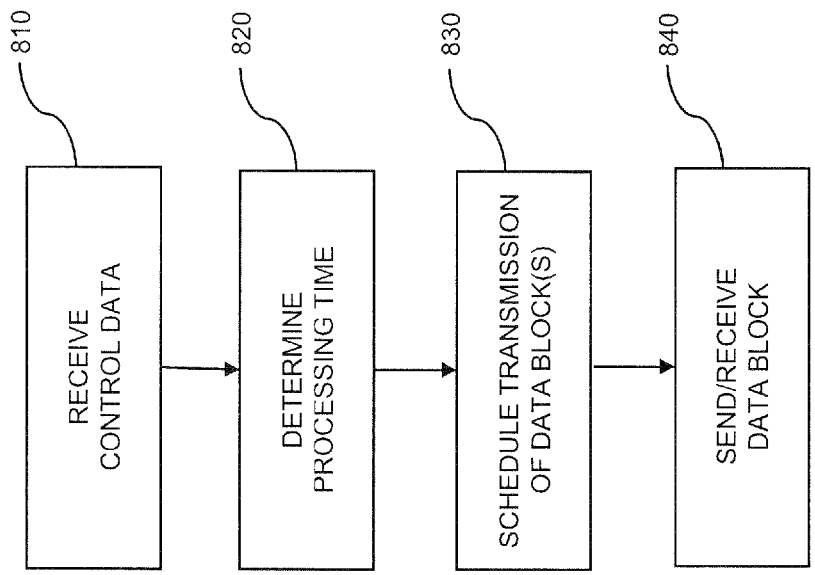
FIG. 8 shows a flowchart for illustrating a method according to an embodiment of the invention.

FIG. 8 shows a flowchart for schematically illustrating a method which may be used to implement the above-described concepts in a node of a mobile network which is responsible for scheduling transmissions of data blocks to or from a terminal device, e.g., in the BS 100 or in the control node 300.

At step 810, the node may receive control data. For example, the control data may be received from the terminal device. Alternatively or in addition, the control data may also be received from a further node of the mobile network. For example, the BS 100 of FIG. 1 may receive the control data from the control node 300.

At step 820, the node determines, from a plurality of supported processing times, a processing time required by the terminal device for processing signals for transmission of a data block. The processing time may be determined as a value of a HARQ feedback time. The processing time may for example correspond to or reflect a decoding time required by the terminal device for decoding received signals for transmission of a data block from the mobile network to the terminal device. The processing time may also correspond to or reflect an encoding time required by the terminal device for encoding signals for transmission of a data block from the terminal device to the mobile network.

The node may determine the processing time on the basis of the control data received at step 810. For example, the control data may explicitly indicate the processing time. The node may also determine the processing time on the basis of data indicating a device category of the terminal device. Such data may in turn be included in the control data as received at step 810. The processing time may be a value which is stored in association with the device category, e.g., in a lookup table. The node may also determine the processing time on the basis of data related to the terminal device which are received from a database, e.g., the database 320 of FIG. 1. Such data may again be included in the control data as received at step 810. The node may also determine the processing time on the basis of a size of the data block.

The node may also initiate measurements to determine the processing time. For example, the node may evaluate a response of the terminal device to a received data block. The node may also send a request for measuring the processing time to the terminal device.

Having determined the processing time, the node may send control data indicating the determined processing time to the terminal device. The terminal device may then adjust its operation accordingly, e.g., by entering or leaving a low power mode, by stopping monitoring of a control channel as explained in connection with FIG. 3, or by refraining from processing received transmissions as explained in connection with FIG. 4.

At step 830, the node schedules the transmission of the data block on the basis of the processing time as determined at step 820. This may involve controlling a time interval between sending the signals for transmission of two consecutive data blocks to be larger than the determined processing time, e.g., as explained in connection with FIG. 2.

At step 840, the node may send or receive the data block through the scheduled transmission. If the node is a BS, the data block may be sent or received using a radio interface of the BS. If the node is a control node, the data block may be sent or received via a BS of the mobile network.

Figure 9:
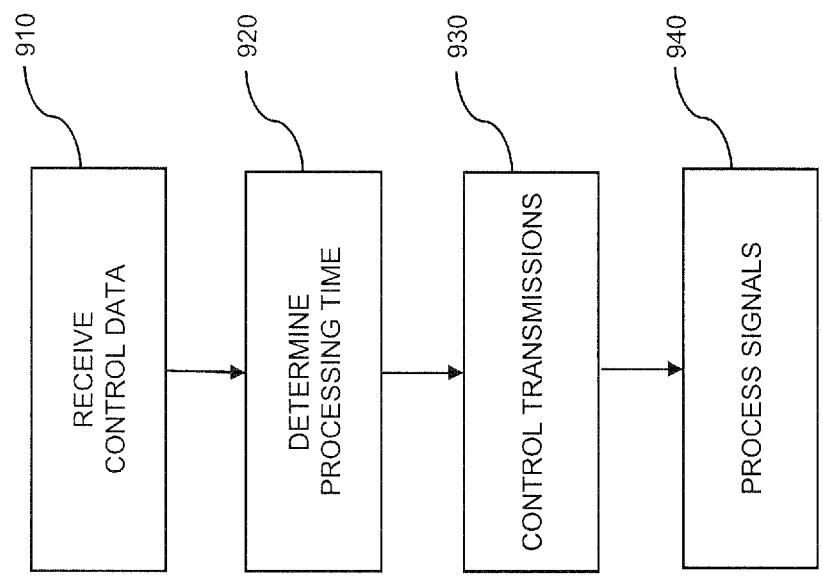
FIG. 9 shows a flowchart for illustrating a further method according an embodiment of the invention.

FIG. 9 shows a flowchart for schematically illustrating a method which may be used to implement the above-described concepts in a terminal device performing transmissions of data blocks to or from a mobile network, e.g., in the terminal devices 200 or 200'.

At step 910, the terminal device may receive control data. For example, the control data may be received from a BS of the mobile network or from a control node of the mobile network, e.g., from the BS 100 or from the control node 300.

At step 920, the terminal device determines, from a plurality of supported processing times, a processing time required by the terminal device for processing signals for transmission of a data block. The processing time may be determined as a value of a HARQ feedback time. The processing time may for example correspond to or reflect a decoding time required by the terminal device for decoding received signals for transmission of a data block from the mobile network to the terminal device. The processing time may also correspond to or reflect an encoding time required by the terminal device for encoding signals for transmission of a data block from the terminal device to the mobile network.

The terminal device may determine the processing time on the basis of the control data received at step 910. For example, the control data may explicitly indicate the processing time. The terminal device may also determine the processing time on the basis of a size of the data block. The terminal device may also perform a measurement to determine the processing time. For example, the terminal device may measure the time needed to process received signals for transmission of a data block having a given size. Accordingly, the terminal device may determine the processing time by evaluating processing of the signals for transmission of one or more of the data blocks The measurement or evaluation may be accomplished in response to a request for measuring the processing time received from the mobile network.

Having determined the processing time, the terminal device may send control data indicating the determined processing time to the mobile network, e.g., as in message 202 of FIG. 2.

At step 930, the terminal device may control transmission of the data blocks on the basis of the determined processing time, e.g., by entering or leaving a low power mode, by stopping monitoring of a control channel as explained in connection with FIG. 3, or by refraining from processing received transmissions as explained in connection with FIG. 4. For example, the terminal device may receive, on a control channel, scheduling information for transmission of one of the data blocks. Then, during a time interval corresponding to the processing time and starting after receiving the scheduling information, the terminal device may stop monitoring of the control channel.

At step 940, the terminal device may send or receive a data block and process the signals for receiving the data block. In some scenarios, this may depend on the operation of the terminal device as controlled at step 930. For example, the terminal device may receive signals for transmission of a first data block. Then, during a time interval corresponding to the processing time and starting after receiving the signals for transmission of the first data block, the terminal device may receive signals for transmission of a second data block. In this case, before attempting to decode the signals for transmission of the second data block, the terminal device may send, with respect to the signals for transmission of the second data block, a negative acknowledgement message of a retransmission protocol. Further, the terminal device may receiving signals for retransmission of the second data block, then the terminal device may select between decoding the signals for transmission of the second data block and decoding the signals for retransmission of the second data block. An example of such processing is explained in connection with FIG. 4.

The methods of FIGS. 8 and 9 may be combined with each other in a system in which a node of the mobile network operates in accordance with the method of FIG. 8 and a terminal device operates in accordance with the method of FIG. 9.

As can be seen, by using the above described concepts different processing capabilities of terminal devices can be efficiently supported in the mobile network. In this way, a mobile network designed for large bandwidth and/or high throughput, such as an LTE mobile network, can also accommodate low-performance terminal devices, such as MTC terminal devices. Further, a low-power mode of terminal devices can be supported in an efficient manner.

It is to be understood that the examples and embodiments as explained above are merely illustrative and susceptible to various modifications. For example, the concepts could be used in types of mobile network which differ from the above-mentioned examples of an LTE mobile network or UMTS mobile network. Further, it is to be understood that the above concepts may be implemented by using correspondingly designed software in existing mobile network nodes or terminal devices, or by using dedicated hardware of such mobile network nodes or terminal devices.

The invention claimed is:

1. A method of controlling transmission of data blocks between a mobile network and at least one terminal device, the method comprising:
   a scheduling node of the mobile network determining, from a plurality of supported processing times, a processing time required by the terminal device for at least one of:
      decoding signals for transmission from a transmitting node of a first one of the data blocks from the mobile network to the terminal device;
      encoding signals for transmission from a transmitting node of a first one of the data blocks from the terminal device to the mobile network;
   the scheduling node scheduling the transmission from the transmitting node of a second one of the data blocks based on the determined processing time, wherein the second of the data blocks is scheduled to be transmitted from the transmitting node after the first one of the data blocks is transmitted from the transmitting node.

2. The method of claim 1, further comprising:
the scheduling node receiving control data;
the scheduling node determining the processing time based on the received control data.

3. The method of claim 2, wherein the scheduling node receives the control data from the terminal device.

4. The method of claim 2, wherein the scheduling node receives the control data from a further node of the mobile network.

5. The method of claim 1, wherein the scheduling node determines the processing time based on data indicating a device category of the terminal device.

6. The method of claim 1, further comprising:
the scheduling node receiving data related to the terminal device from a database;
the scheduling node determining the processing time based on the data received from the database.

7. The method of claim 1, further comprising the scheduling node determining the processing time by evaluating a response of the terminal device to a received data block.

8. The method of claim 1, further comprising the scheduling node providing control data indicating the determined processing time to the terminal device.

9. The method of claim 1, wherein the scheduling node controls a time interval between sending the signals for transmission of two consecutive data blocks to be larger than the determined processing time, wherein the first one and the second one are the two consecutive data blocks.

10. The method of claim 1, wherein the scheduling node determines the processing time based on a size of one or more of the data blocks.

11. A method of controlling transmission of data blocks between a mobile network and a terminal device, the method comprising:
the terminal device determining, from a plurality of supported processing times, a processing time required by the terminal device for at least one of:
decoding signals for transmission of a first one of the data blocks from the mobile network to the terminal device;
encoding signals for transmission of the first one of the data blocks from the terminal device to the mobile network;
the terminal device controlling the transmission of a second one of the data blocks based on the determined processing time, wherein the second one of the data blocks is controlled to be transmitted after the first one of the data blocks is transmitted.

12. The method of claim 11, further comprising:
the terminal device receiving control data from the mobile network;
the terminal device determining the processing time based on the received control data.

13. The method of claim 11, wherein the terminal device determines the processing time by evaluating processing of the signals for transmission of one or more of the data blocks.

14. The method of claim 11, further comprising the terminal device sending control data indicating the determined processing time to the mobile network.

15. The method of claim 11, further comprising:
the terminal device receiving, on a control channel, scheduling information for transmission of one of the data blocks;
during a time interval corresponding to the processing time and starting after receiving the scheduling information, the terminal device stopping monitoring of the control channel.

16. The method of claim 11, further comprising:
the terminal device receiving signals for transmission of the first one of the data blocks;
during a time interval corresponding to the processing time and starting after receiving the signals for transmission of the first one of the data blocks, the terminal device receiving signals for transmission of the second one of the data blocks;
before attempting to decode the signals for transmission of the second one of the data blocks, the terminal device sending, with respect to the signals for transmission of the second one of the data blocks, a negative acknowledgement message of a retransmission protocol.

17. The method of claim 16, further comprising:
the terminal device receiving signals for retransmission of the second one of the data blocks;
the terminal device selecting between decoding the signals for transmission of the second one of the data blocks and decoding the signals for retransmission of the second one of the data blocks.

18. A scheduling node for controlling transmission of data blocks between a mobile network and at least one terminal device, the node comprising a processor and a memory, the memory containing instructions executable by the processor whereby the scheduling node is configured to:
determine, from a plurality of supported processing times, a processing time required by the terminal device for at least one of:
decoding signals for transmission from a transmitting node of a first one of the data blocks from the mobile network to the terminal device;
encoding signals for transmission from a transmitting node of a first one of the data blocks from the terminal device to the mobile network;
schedule transmission from the transmitting node of a second one of the data blocks based on the determined processing time, wherein the second of the data blocks is scheduled to be transmitted from the transmitting node after the first one of the data blocks is transmitted from the transmitting node.

19. A terminal device for use in a mobile network, the terminal device comprising:
a radio interface for transmission of data blocks with respect to the mobile network;
a processing circuit configured to:
determine, from a plurality of supported processing times, a processing time required by the terminal device for at least one of:
decoding signals for transmission of a first one of the data blocks from the mobile network to the terminal device;
encoding signals for transmission of the first one of the data blocks from the terminal device to the mobile network;
control transmission of a second one of the data blocks based on the determined processing time, wherein the second one of the data blocks is controlled to be transmitted after the first one of the data blocks is transmitted.

20. A computer program product stored in a non-transitory computer readable medium for controlling transmission of data blocks between a mobile network and at least one terminal device, the computer program product comprising software instructions which, when run on a processing circuit of a scheduling node of the mobile network, causes the scheduling node to:
   determine, from a plurality of supported processing times, a processing time required by the terminal device for at least one of:
      decoding signals for transmission from a transmitting node of a first one of the data blocks from the mobile network to the terminal device;
      encoding signals for transmission from a transmitting node of a first one of the data blocks from the terminal device to the mobile network;
   schedule the transmission from the transmitting node of a second one of the data blocks based on the determined processing time, wherein the second of the data blocks is scheduled to be transmitted from the transmitting node after the first one of the data blocks is transmitted from the transmitting node.

21. A computer program product stored in a non-transitory computer readable medium for controlling transmission of data blocks between a mobile network and at least one terminal device, the computer program product comprising software instructions which, when run on a processing circuit of a terminal device, causes the terminal device to:
   determine, from a plurality of supported processing times, a processing time required by the terminal device for at least one of:
      decoding signals for transmission of a first one of the data blocks from the mobile network to the terminal device;
      encoding signals for transmission of the first one of the data blocks from the terminal device to the mobile network;
   control the transmission of a second one of the data blocks based on the determined processing time, wherein the second one of the data blocks is controlled to be transmitted after the first one of the data blocks is transmitted.

22. The method of claim 1, wherein the transmitting node is the scheduling node.

23. The method of claim 1, wherein scheduling transmission of the second one of the data blocks comprises determining particular time resources and/or frequency resources for transmission of the second one of the data blocks.

24. The method of claim 23, wherein scheduling transmission of the second one of the data blocks comprises determining the time resources and/or frequency resources on which transmission of the second one of the data blocks is to occur.

25. The method of claim 1, wherein the method comprises storing the time of transmission of the first one of the data blocks, and scheduling the transmission of the second one of the data blocks as an offset from the time of the transmission of the first one, wherein said scheduling comprises determining the offset based on the determined processing time.

26. The method of claim 1, wherein the processing time is a time required by the terminal device to send an acknowledgement (ACK) or negative acknowledgement (NACK) for the first one of the data blocks, since a time that the terminal device receives the first one of the data blocks.

* * * * *